(12) United States Patent
Abeygunasekara et al.

(10) Patent No.: US 12,213,024 B2
(45) Date of Patent: Jan. 28, 2025

(54) LOCATIONING SYSTEM THAT UTILIZES READ DATA OF A READER OF A DEVICE

(71) Applicant: ZEBRA TECHNOLOGIES CORPORATION, Lincolnshire, IL (US)

(72) Inventors: Ahangama Withanage Amila Udara Abeygunasekara, Kandy (LK); Raveen T. Thrimawithana, Pannipitiya (LK); Ashan Lakshitha Wimalasiri, Ganemulla (LK); Pushpika Munasinghe, Ratnapura (LK); Mahesh Eranda Indrajith Pitakotuwa, Pilimathalawa (LK); Sameera D. Nanayakkara, Habarakada (LK)

(73) Assignee: Zebra Technologies Corporation, Lincolnshire, IL (US)

( * ) Notice: Subject to any disclaimer, the term of this patent is extended or adjusted under 35 U.S.C. 154(b) by 534 days.

(21) Appl. No.: 17/546,699

(22) Filed: Dec. 9, 2021

(65) Prior Publication Data

US 2023/0188936 A1    Jun. 15, 2023

(51) Int. Cl.
*H04W 4/029* (2018.01)
*G06K 7/14* (2006.01)
*H04W 64/00* (2009.01)

(52) U.S. Cl.
CPC .......... *H04W 4/029* (2018.02); *G06K 7/1434* (2013.01); *H04W 64/003* (2013.01)

(58) Field of Classification Search
CPC ..... H04W 4/029; H04W 64/003; H04W 4/02; H04W 4/33; H04W 4/80; H04W 4/021; H04W 4/023; H04W 64/00; H04W 12/06; H04W 4/38; H04W 12/08; H04W 4/025; H04W 84/12; H04W 88/02; H04W 4/024; H04W 4/21; H04W 12/63; H04W 8/005; H04W 88/08; H04W 48/18; H04W 48/04; H04W 72/541; H04W 72/542; H04W 12/64; H04W 48/10; H04W 40/244; H04W 40/16; H04W 52/0209; H04W 28/0226;

(Continued)

(56) References Cited

U.S. PATENT DOCUMENTS

2018/0206065 A1*  7/2018  Moshfeghi ............ H04W 4/027
2018/0338217 A1*  11/2018  Sadr ..................... H04W 4/027

(Continued)

*Primary Examiner* — Marcos L Torres
*Assistant Examiner* — Jing Gao

(57) ABSTRACT

In some implementations, a locationing system may receive, from a user device, locationing information associated with the user device. The locationing information may include signal-based locationing information associated with a wireless communication device associated with the locationing system and an object identifier associated with an object identified by read data obtained by a reader of the user device. The locationing system may determine, based on the object identifier, object location information associated with the object. The locationing system may determine, based on the signal-based locationing information, device location information associated with the user device. The locationing system may determine, based on the object location information and the device location information, a location of the user device. The locationing system may perform an action associated with the location and the user device.

11 Claims, 8 Drawing Sheets

(58) Field of Classification Search
CPC .. G06K 7/1434; G06N 20/00; G06F 16/9554; G06Q 10/063114; G06Q 10/08; G06Q 30/0639; G06Q 10/0833; G06Q 30/0261; G06Q 30/0267; G06Q 30/0255; G01C 21/206; G01C 21/20; G01C 21/362; G01S 5/14; G01S 19/42; G01S 17/89; G01S 5/0027; G01S 5/02; G01S 5/0284; G01S 5/10; G01S 5/02521; G01S 5/0278; G01S 2205/02; G01S 13/767; G01S 2201/02; G01S 1/042; G01S 1/024

See application file for complete search history.

(56) References Cited

U.S. PATENT DOCUMENTS

| | | | |
|---|---|---|---|
| 2021/0027360 A1* | 1/2021 | Shmueli | G06F 1/163 |
| 2021/0127230 A1* | 4/2021 | Mallesan | G01S 5/02695 |

* cited by examiner

LOCATIONING SYSTEM THAT UTILIZES READ DATA OF A READER OF A DEVICE

BACKGROUND

A locationing system may utilize wireless communication to determine and/or track a location of a device (e.g., a mobile device) within a physical environment. For example, the locationing system may utilize wireless communication devices to communicate, via signals, with the device and interpret and/or determine the location of the device based on one or more characteristics of the signals. The location may be determined based on known locations of the wireless communication devices. Structures and or other devices may impact one the characteristics of the signals by causing multipath and/or interference, thereby reducing accuracy with respect to determining a location of a device within the physical environment. Accordingly, there is a need for a locationing system that can address the impact of structures and/or other devices in the physical environment.

SUMMARY

Some implementations described herein relate to a method for locating a device. The method may include receiving, from a user device, locationing information associated with the user device, where the locationing information includes: signal-based locationing information associated with a wireless communication device associated with the locationing system and an object identifier associated with an object identified by read data obtained by a reader of the user device. The method may include identifying, from the inventory data structure and based on the object identifier, object location information associated with the object, where the inventory data structure associates the object identifier with the object location. The method may include determining, based on the signal-based locationing information, a signal-based location associated with the user device. The method may include determining, using the locationing model, a location of the user device, where the locationing model is configured to indicate the location of the device based on the object location information and the signal-based location. The method may include performing, by the locationing system, an action associated with the location and the user device.

Some implementations described herein relate to a device associated with a locationing system. The device associated with a locationing system may include one or more memories and one or more processors coupled to the one or more memories. The device may be configured to receive, from a user device, an object identifier associated with an object in a physical environment. The device may be configured to determine, based on the object identifier, object-based locationing information associated with a first location associated with the object. The device may be configured to receive signal information associated with a wireless communication device that is associated with the locationing system. The device may be configured to determine, based on the signal information, signal-based locationing information associated with the user device. The device may be configured to process, using a locationing model, the object-based locationing information and the signal-based locationing information to determine a location of the user device. The device may be configured to perform an action associated with the location and the user device.

Some implementations described herein relate to a system. The system may include an inventory data structure, a user device that includes a reader, a wireless communication device, and a controller. The controller may be configured to receive, from the user device, read data associated with a read operation of the reader. The controller may be configured to determine, based on the read data, object information associated with an object in a physical environment. The controller may be configured to determine, based on the object information and an entry of the inventory data structure, object-based locationing information associated with a first location associated with the object. The controller may be configured to receive, from the user device, signal information associated with a signal that is communicated between the user device and the wireless communication device. The controller may be configured to determine, based on the signal information, signal-based locationing information associated with the user device, where the signal-based locationing information is indicative of a second location associated with the wireless communication device. The controller may be configured to determine, using a locationing model, a location of the user device based on the first location and the second location. The controller may be configured to perform an action associated with the location and the user device.

DETAILED DESCRIPTION

Figure 1A:
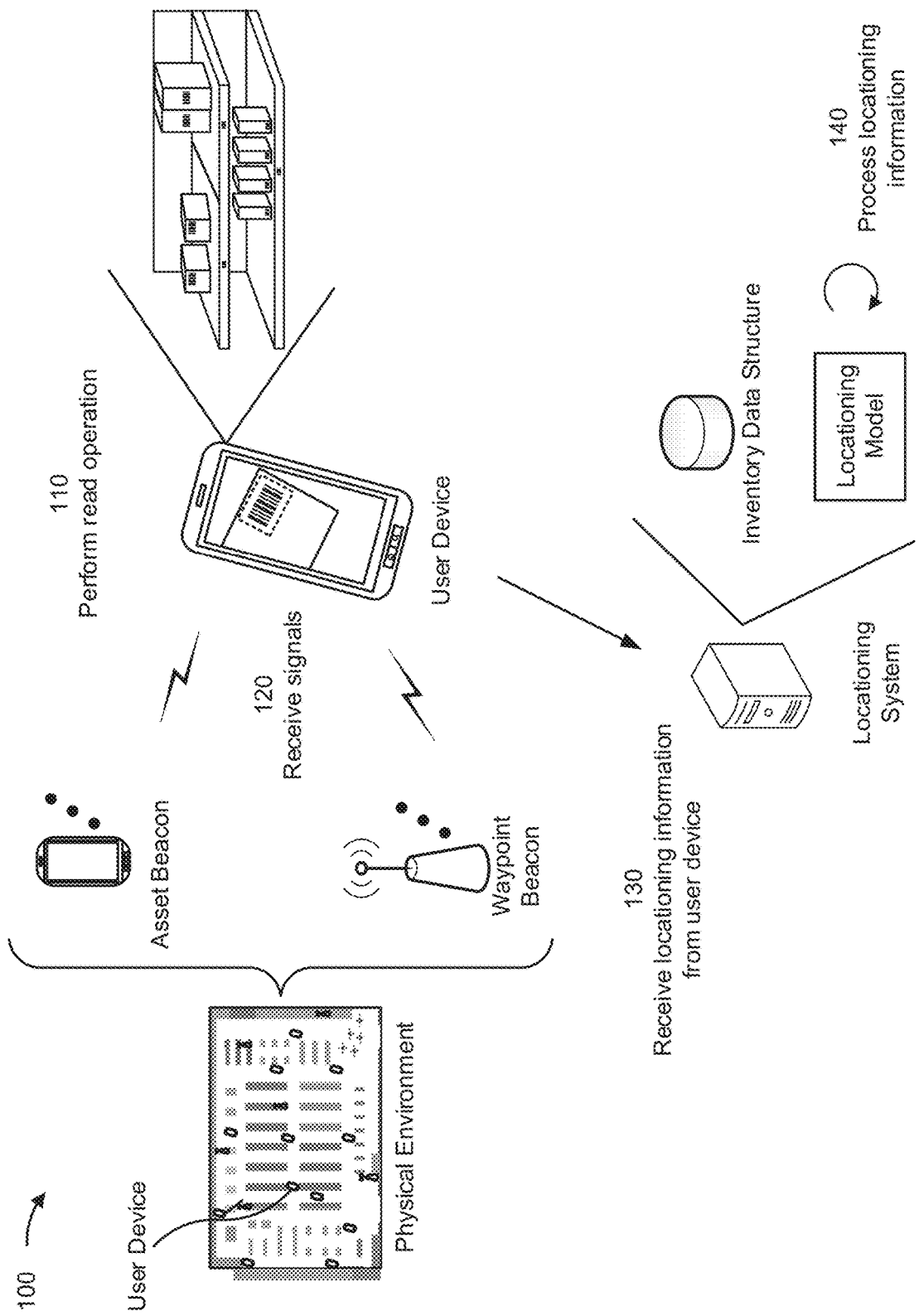
FIGS. 1A-1B are diagrams of one or more example implementations associated with a locationing system described herein.

The following detailed description of example implementations refers to the accompanying drawings. The same reference numbers in different drawings may identify the same or similar elements.

A wireless locationing system typically relies on wireless communication devices that utilize wireless signals to communicate with a user device (e.g., a smartphone, a tablet computer, a laptop computer, a mobile barcode reader, a mobile radio frequency identification (RFID) reader, or other type of mobile device). For example, the wireless signals may utilize one or more of a BLUETOOTH® signal, a BLUETOOTH® Low-Energy (BLE) signal, a Wi-Fi signal, an ultra-wideband signal, or the like.

In some instances, an entity (e.g., an individual, organization, business, or other type of entity) may seek to track a location of the user device within a physical environment associated with the entity. For example, a retail organization may seek to track user devices that are used within a retail location (e.g., a storefront and/or inventory storage location)

associated with the retail organization. As another example, a logistics organization may seek to track user devices that are used within an inventory management location (e.g., a warehouse, transportation terminal, or the like). In such cases, the physical environment typically includes multiple structures, mobile equipment (e.g., autonomous, semi-autonomous, or non-autonomous vehicles for moving items within the physical environment), and/or other devices that can impact a characteristic of wireless communication signals that reduces an ability to locate a user device with a desired level of accuracy (e.g., within 10 centimeters (cm) or less). Therefore, there is a need for a locationing system that is capable of accounting for impacts to a characteristic of a wireless communication signal and/or that is capable of locating a user device within a particular desired level of accuracy.

Some implementations described herein include a locationing system that utilizes a reader and/or read data from a reader (e.g., a barcode reader, an RFID reader, a camera, or the like) to accurately and effectively locate a user device within a physical environment. The read data may be used to determine a location associated with an object that was read, during a read operation of the reader of the user device, according to an entry of an inventory data structure. For example, the entry may indicate the location (e.g., a bin location, an aisle location, or other reference location associated with the locationing system) associated with the object in order to track the object and/or a storage (or home) location of the object. In this way, because the read data is to be obtained from the user device when the user device is within the presence of the object (e.g., because the reader may need to have line of sight to read a barcode, be within an radio frequency (RF) communication range of an RFID tag, and/or be within a field of view of a camera), the locationing system may use the read data to derive and/or determine a location of the user device based on identifying, within the inventory data structure, a location of an object associated with the read data.

In some instances, an object associated with read data obtained by a user device may be movable. Accordingly, the user device may cause the reader to perform a read operation at a location that is remotely located from a known or indicated location within the inventory data structure. Accordingly, the locationing system may utilize the read data in combination with one or more sets of signal-based information from one or more wireless communication devices in order to locate the user device as described herein. In some implementations, the locationing system may utilize a locationing model to identify (or determine) the location of the user device. For example, the locationing model may include a machine learning model that is trained and/or configured to determine the location of the user device using historical data that is associated with the locationing system and/or the physical environment. More specifically, the locationing model may utilize object-based locationing information (e.g., determined from the read data) from the user device, signal-based locationing information (e.g., determined from a signal associated with a wireless communication device) associated with the user device, and the historical data as inputs to the model in order to determine the location of the user device. Additionally, or alternatively, the locationing system may utilize a scoring system (e.g., a Bayesian filter system) that is configured to derive a location of the user device (e.g., in an iterative manner).

In this way, the locationing system, as described herein, may utilize various types of locationing information and/or a locationing model to robustly and accurately determine or identify a location of a user device within a physical environment. Therefore, the locationing system, as descried herein, may reduce consumption of computing resources (e.g., memory resources and/or processor resources) that would otherwise be wasted on processing an inaccurately determined location of a user device using a system or locationing information other than what is described herein.

Figure 1B:
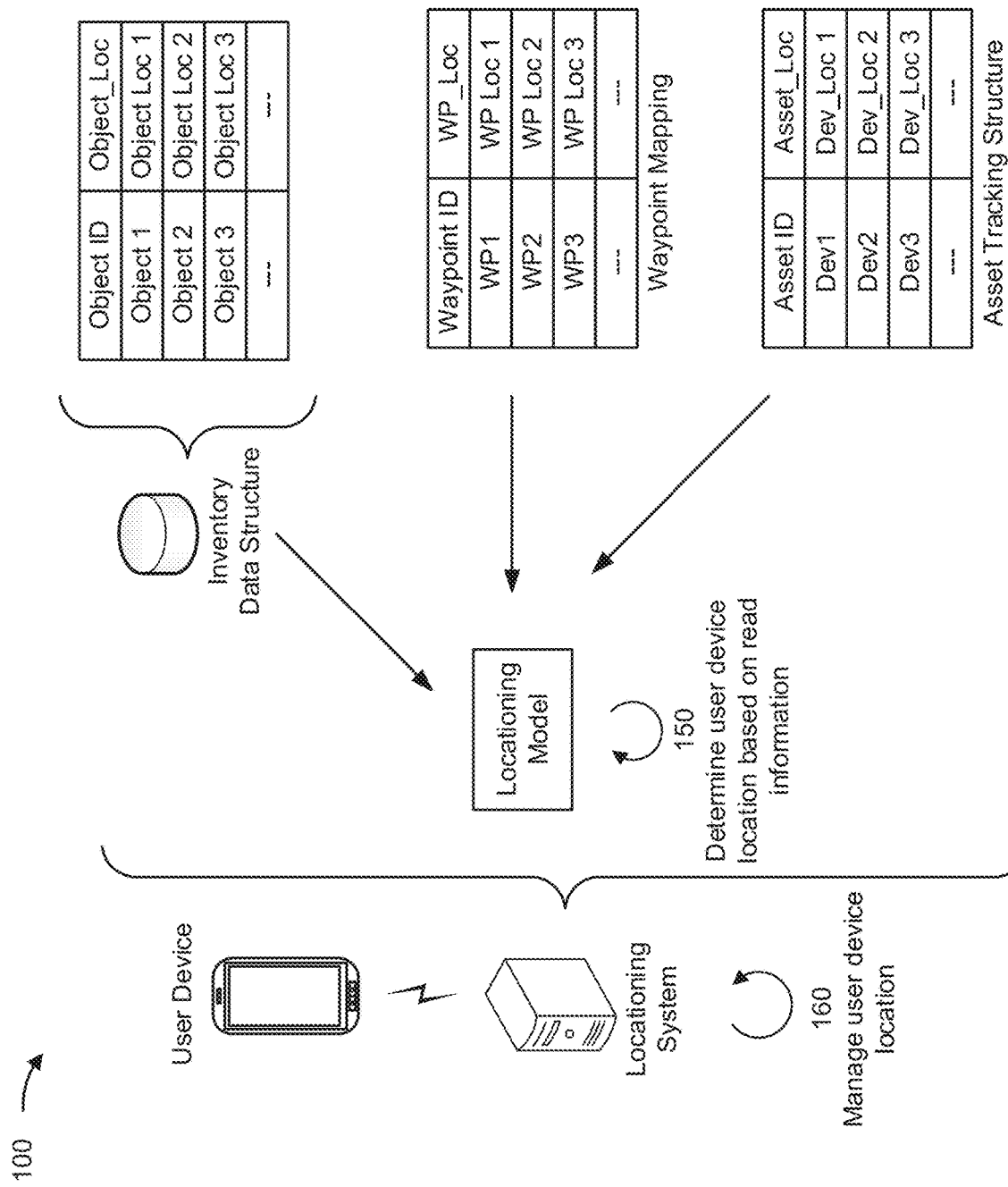

FIGS. 1A-1B are diagrams of an example implementation 100 associated with a locationing system that utilizes read data as described herein. As shown in FIGS. 1A-1B, example implementation 100 includes a locationing system, a user device, and one or more wireless communication devices (shown as Asset(s) and Waypoint(s)). These devices are described in more detail below in connection with FIG. 5 and FIG. 6.

The locationing system may include an inventory data structure and/or a locationing model described herein. The inventory data structure may include entries associated with objects that identify respective locations of the objects. Accordingly, a location of an object (e.g., an object-based location) may be identified based on a look-up operation of an entry associated with the object in the inventory data structure (e.g., using an object identifier or other type of object information). Locationing may involve determining a distance from a known location and/or determining a location (e.g., using triangulation or other similar techniques) according to the distance and/or the known location.

As shown in FIG. 1A, and by reference number 110, the user device performs a read operation. For example, the user device may perform a read operation using a reader of the user device. The reader may include a barcode reader, an RFID reader, a camera, or other type of reader that is capable of identifying an object based on a read operation that involves the object.

The read operation, as performed by the reader, may include reading a barcode associated with the object (e.g., a barcode attached to the object or packaging of the object and/or a barcode that is positioned in association with a storage location of the object, such as near a bin of a shelf that is holding the object) and decoding the barcode. Accordingly, from reading (e.g., scanning and/or capturing an image of) the barcode, the user device and/or the locationing system, as described herein, may identify the object (e.g., by obtaining an object identifier) and/or obtain object information associated with the object (e.g., the object identifier, a location of the object, a manufacturer associated with the object, and/or the like).

In some implementations, the read operation may include reading an RFID tag associated with the object. For example, the user device, via the reader, may process RF communications from the RFID tag that identify the object and/or indicate a location of the object relative to the user device. Additionally, or alternatively, the read operation may include capturing an image of the object in order to permit the object to be identified within the image using any suitable image processing technique (e.g., an object recognition technique, an object detection technique, an edge detection technique, an optical character recognition technique, or the like). For example, the user device and/or the locationing system may be configured to utilize an image processing model to identify the object and/or determine a location of the object via the inventory data structure, as described herein, based on identifying the object and an entry in the inventory data structure that is associated with the object and indicates a location associated with the object.

As further shown in FIG. 1A, and by reference number 120, the user device receives one or more signals from one or more wireless communication devices. The one or more signals may be received and/or communicated for the purposes of locationing as described herein. For example, a signal of the one or more signals may be an advertisement or other type of locationing signal that is communicated using a communication structure, such as a protocol data unit (PDU), a packet, a frame, a datagram, a segment, a message, a block, a cell, a frame, a subframe, a slot, a symbol, a portion of any of the above, and/or another type of formatted or unformatted data capable of being wirelessly transmitted.

The user device may process a signal to determine and/or generate signal-based locationing information that identifies a signal-based location. For example, the user device may process the signal to determine a signal-based location of the user device according to a characteristic of the signal, such as a signal-to-noise ratio (SNR) of the signal, a received signal strength indicator (RSSI) associated with the signal, and/or a frequency of the signal, among other examples. The user device (and/or the location management system) may determine the signal-based location using any suitable technique, such as a triangulation analysis or other signal processing technique. In some implementations, the user device may generate and/or include the characteristic (and/or information that identifies the characteristic) within signal-based locationing information to permit the user device to provide the signal-based locationing information to the locationing system, as described herein.

As shown, the wireless communication devices may include a waypoint beacon and/or an asset beacon associated with the locationing system. The waypoint beacon may be fixed at a known location of the physical environment. For example, the waypoint beacon may be an access point of a communication network (e.g., a Wi-Fi access point of a Wi-Fi network). Additionally, or alternatively, the waypoint beacon may be a short range wireless communication device of a short range wireless communication device mesh network (e.g., a BLUETOOTH® mesh network and/or a BLE mesh network).

The asset beacon may be a mobile device or a client device associated with the locationing system. The asset beacon may be configured to communicate signals (e.g., advertisements) to and/or from the user device in order to permit the locationing system to determine the location of the user device. For example, the asset beacons may be configured for peer-to-peer (p2p) communication to enable the asset beacons to communicate with one another and/or with the user device. In some implementations, the user device may be a same type of device as one or more of the asset beacons. For example, the locationing system may be configured to track and/or monitor the location of the user device and/or the asset beacons. In this way, while example implementation 100 is described in connection with determining and/or managing a location associated with the user device, the locationing system may similarly determine and/or manage locations associated with the assets, as described in connection with the user device.

As further shown in FIG. 1A, and by reference number 130, the locationing system receives locationing information. For example, the locationing system may receive the locationing information to permit the locationing system to determine a location of the user device as described herein. The locationing system may receive the locationing information based on the user device performing a read operation and/or based on the user device communicating locationing signals with one or more of the wireless communication devices.

The locationing system may receive the locationing information from the user device and/or one or more of the wireless communication devices. For example, the locationing system may receive object-based locationing information from the user device and/or signal-based locationing information from the user device. In some implementations, the locationing system may receive the signal-based locationing information from one or more of the wireless communication devices. The signal-based locationing information may identify the user device. For example, the user device may include a device identifier associated with the user device. Additionally, or alternatively, a wireless communication device may include the device identifier (e.g., based on extracting the device identifier from a signal received from the user device).

As further shown in FIG. 1A, and by reference number 140, the locationing system processes the locationing information. For example, the locationing system may process the locationing information using a locationing model. The locationing model may utilize one or more techniques to determine a location of the user device based on the locationing information. For example, the locationing model may utilize a Bayesian processing technique (e.g., a Bayesian filter), a scoring system, and/or a machine learning model, among other examples.

In example implementation 100, the locationing system includes an inventory data structure. The inventory data structure may include entries associated with objects that are stored (and/or that are configured to be stored) within the physical environment. An entry of the inventory data structure may identify the object (e.g., via an object identifier or other object information) and object location information that identifies a location of the physical environment where the object is configured to be stored and/or known to be located. The location information may include coordinates associated with a reference coordinate system (e.g., a two-dimensional grid or three-dimensional grid) of the locationing system. Additionally, or alternatively, the location information may identify a bin, a shelf, and/or an aisle where the object is configured to be stored. In this way, the locationing system may utilize the inventory data structure to identify a location of the object and/or a corresponding location of the user device based on the user device performing a read operation associated with the object.

In some implementations, the locationing model may include and/or be associated with a machine learning model. For example, the machine learning model may include a neural network (e.g., a recurrent neural network, a convolutional neural network, a random forest model, a regression model, a support vector machine, or any other type of machine learning model). The machine learning model may be trained based on one or more locationing parameters associated with the locationing information, such as a type of the locationing information (e.g., whether object-based locationing information or signal-based locationing information), a type of read data or read operation associated with object-based locationing information (e.g., whether associated with a barcode, an RFID tag, and/or an image depicting an object), a type (or communication protocol) of a signal involved in signal-based locationing information of the locationing information, a characteristic of a signal associated with the signal-based locationing information, a location of a wireless communication device associated with the signal-based locationing information, and/or a type of wireless communication device associated with the signal-based locationing information, among other examples. The machine learning model may be trained based on historical data associated with the one or more locationing parameters that are associated with previously locating the object (or a same type of the object) or other objects within the physical environment. Using the historical data and/or one or more of the locationing parameters as inputs to the locationing model, the locationing system may determine a location of the user device to permit the locationing system to manage the location of the user device, as described herein.

As shown in FIG. 1B, and by reference number 150, the locationing system determines the location of the user device. For example, the locationing system may utilize the locationing model to determine the location of the user device. Accordingly, the locationing system may utilize a machine learning model to determine a location of the user device based on the object-based locationing information and/or the signal-based locationing information. In some implementations, the locationing system may utilize the machine learning model to determine the location of the user device based on a first location (e.g., an object-based location) associated with the object-based locationing information and a second location (e.g., a signal-based location) associated with the signal-based locationing information.

In some implementations, the locationing system can utilize a scoring system to determine a location of the user device based on locationing parameters of individual sets (e.g., an object-based locationing information set and/or a signal-based locationing information set) of the locationing information. Using such a scoring system, the locationing system can apply weights (w) to parameters (e.g., locations determined using one or more of the techniques described herein) based on the locationing parameters of the sets of locationing information and/or an analysis of the individual sets of locationing information. For example, the locationing system may apply weights based on a probability or likelihood that the user device is located near a location (e.g., an object-based location or a signal-based location) that is indicated by a particular set of the locationing information. More specifically, the locationing system may apply a first weight to the object-based locationing information and a second weight to the signal-based locationing information (which may be different from the first weight).

To determine a weight for the object-based locationing information, the locationing system may perform an analysis (e.g., a Bayesian analysis) of the object-based locationing information to determine a confidence score that is indicative of whether the object is located at a location associated with the object in the inventory data structure (e.g., a probability that the object is at the location identified in a corresponding entry of the inventory data structure). If a confidence score indicates that the user device is likely not near the location associated with the object (e.g., because the signal-based locationing information indicates that the user device is relatively far from that location), a relatively lower weight may be applied to the object-based locationing information. On the other hand, if a confidence score indicates that the user device is likely near the location associated with the object (e.g., because the signal-based locationing information indicates that the user device is relatively near to that location), a relatively higher weight may be applied to the object-based locationing information.

Additionally, or alternatively, to determine a weight for the signal-based locationing information, the locationing system may perform an analysis of the signal-based locationing information to determine a confidence score that is indicative of a degree of accuracy of a determined location of the user device based on signals from one or more of the wireless communication devices. For example, if a characteristic (e.g., an SNR and/or an RSSI) of a signal associated with the signal-based locationing information indicates that the signal cannot be reliably used to determine a location of the user device, then the locationing system may give the signal-based locationing information a relatively lower weight. Additionally, or alternatively, if the characteristic of the signal associated with the signal-based locationing information indicates that the signal can be reliably used to determine a location or the user device, then the locationing system may give the signal-based locationing information a relatively higher weight.

Accordingly, the locationing system can determine (e.g., via one or more calculations associated with the scoring system) scores for a set of locationing information and/or locationing parameters of the set of locationing parameters. For example, the locationing system can use the following to determine the score ($s_{ij}$) based on three locationing parameters a, b, c of a set of locationing information i for a user device j:

$$s_{ij} = w_{aj}a_i + w_{bj}b_i + w_{cj}c_i + \ldots \quad (1)$$

where $w_{aj}$, $w_{bj}$, $w_{cj}$ correspond to adjusted weights based on the relevance to the user device j for parameters $a_i$, $b_i$, $c_i$ that correspond to the locationing parameters of the locationing information i. For example, the locationing parameters $a_i$, $b_i$, $c_i$ may include a value (e.g., a characteristic-specific score) associated with a scale for the respective characteristics associated with parameters $a_i$, $b_i$, $c_i$. Additionally, or alternatively, the adjusted weights $w_{aj}$, $w_{bj}$, $w_{cj}$ may be normalized (e.g., where $0 \leq w_{aj}$, $w_{bj}$, $w_{cj} \leq 1$ and $w_{aj}+w_{bj}+w_{cj}=1$).

As shown, the locationing system may determine the location based on locations of the asset beacons identified in an asset tracking structure and/or locations of waypoint beacons identified in a waypoint mapping. The locations of the asset beacons may be most recently received, determined, and/or indicated locations of the asset beacons, as described herein.

As further shown in FIG. 1B, and by reference number 160, the locationing system may manage the user device location. For example, the user device may perform one or more actions associated with a determined location and/or the user device. For example, the locationing system may provide location information that identifies the location to another user device (e.g., one or more of the assets and/or a device used by a user to manage and/or track locations of the user device and/or the assets via the locationing system). Additionally, or alternatively, the locationing system may indicate, via a user interface of the locationing system, the location in association with an identifier of the user device (e.g., to permit a user to locate the user device via the user interface). The locationing system may store the location information in association with the user device and/or a timestamp in order to track a location of the user device.

In some implementations, the locationing system may further train the locationing model based on the object-based locationing information and/or the signal-based locationing information, as described elsewhere herein. In some implementations, the locationing system may learn a location of an object within a physical environment relative to one or more other wireless communication devices. If a location of an object that is read by the user device is previously unknown (e.g., not indicated within the inventory data structure), the locationing system may update the inventory data structure to indicate the location of the object as indicated by received or determined signal-based locationing information. In this way, the location of the object may be used by the locationing system to locate the user device during a subsequent read associated with the object.

In this way, as described herein, the locationing system may utilize read data associated with a reader of a user device to accurately determine a location of the user device. The read data may be associated with an object at a location of the user device, and thereby provide object-based locationing information that may not be susceptible to interference in a manner that signal-based locationing information may be. Furthermore, the object-based locationing information and//or the signal-based locationing information may be combined and/or utilized by a machine learning model and/or a scoring system to estimate and/or determine a location associated with the user device.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
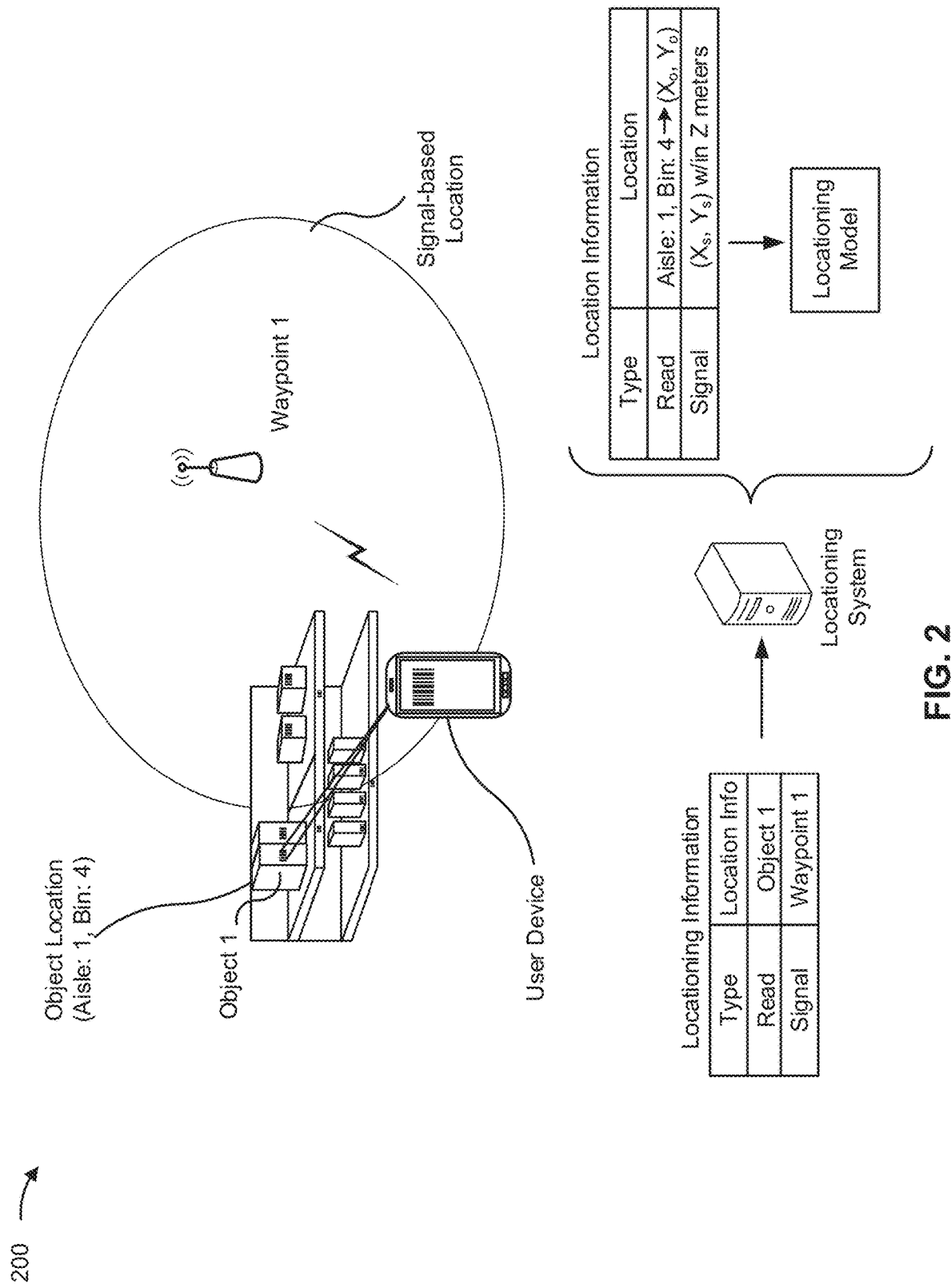
FIG. 2 is a diagram of an example implementation described herein.

FIG. 2 is a diagram of an example implementation 200 associated with a locationing system described herein. As shown in FIG. 2, example implementation 200 includes a user device, an object (Object 1), a wireless communication device (Waypoint 1), and a locationing system.

As shown in example implementation 200, locationing information may be generated that identifies a type associated with a portion of the locationing information. For example, as shown, locationing information with a "read" type may be object-based locationing information, as described herein, and locationing information provided with a "signal" type may be signal-based locationing information. The read-type locationing information may be received based on the user device performing a read operation associated with the object. Accordingly, the locationing information may include an object identifier associated with the object and/or other object information. The signal-type locationing information may be received based on the user device receiving a signal from the wireless communication device. Accordingly, the location information may include an identifier of the waypoint and/or signal information (e.g., signal type, wireless communication device type, communication protocol, RSSI, or the like) associated with a signal (e.g., a locationing signal) associated with the wireless communication device.

In this way, the locationing system may process the locationing information to determine, using a location model, location information associated with a location of the user device, as described herein, using known locations of the object and the wireless communication device. For example, the location information may include and/or indicate an object-based location associated with the object-based locationing information. More specifically, as shown, the object-based location may be indicated and/or identified based on a layout of a physical environment, such as a layout that includes aisles and/or bins within the aisles. In such a case, an inventory data structure associated with the locationing system may indicate locations of objects using corresponding aisle identifiers, bin identifiers, or other types of layout identifiers. Accordingly, as shown, the object-based location may include an aisle identifier and/or bin identifier (Aisle: 1, Bin: 4). Based on the aisle identifier and/or the bin identifier, the locationing system may identify object-based coordinates ($X_o$, $Y_o$) associated with a reference coordinate system of the physical environment. Additionally, or alternatively, the object-based location may include and/or be identified by the object-based coordinates. In such a case, the inventory data structure may indicates locations of objects using object-based coordinates of the reference coordinate system.

Furthermore, the location information may include and/or indicate a signal-based location that is associated with the signal-based locationing information. As shown, the signal-based location may include signal-based coordinates ($X_s$, $Y_s$) and/or a range (Z meters (m)), which may correspond to a threshold level of accuracy associated with determining the coordinates. The signal-based coordinates and/or the range may be determined using any suitable locationing technique that utilizes one or more characteristics of a signal associated with the wireless communication device. In some implementations, the signal-based location may include and/or be identified via values of the one or more characteristics that are used to determine the coordinates.

As shown, the location information may be provided by the locationing model to permit the locationing model to process the location information to determine, predict, and/or indicate a location of the user device, as described herein.

As indicated above, FIG. 2 is provided as an example. Other examples may differ from what is described with regard to FIG. 2.

Figure 3:
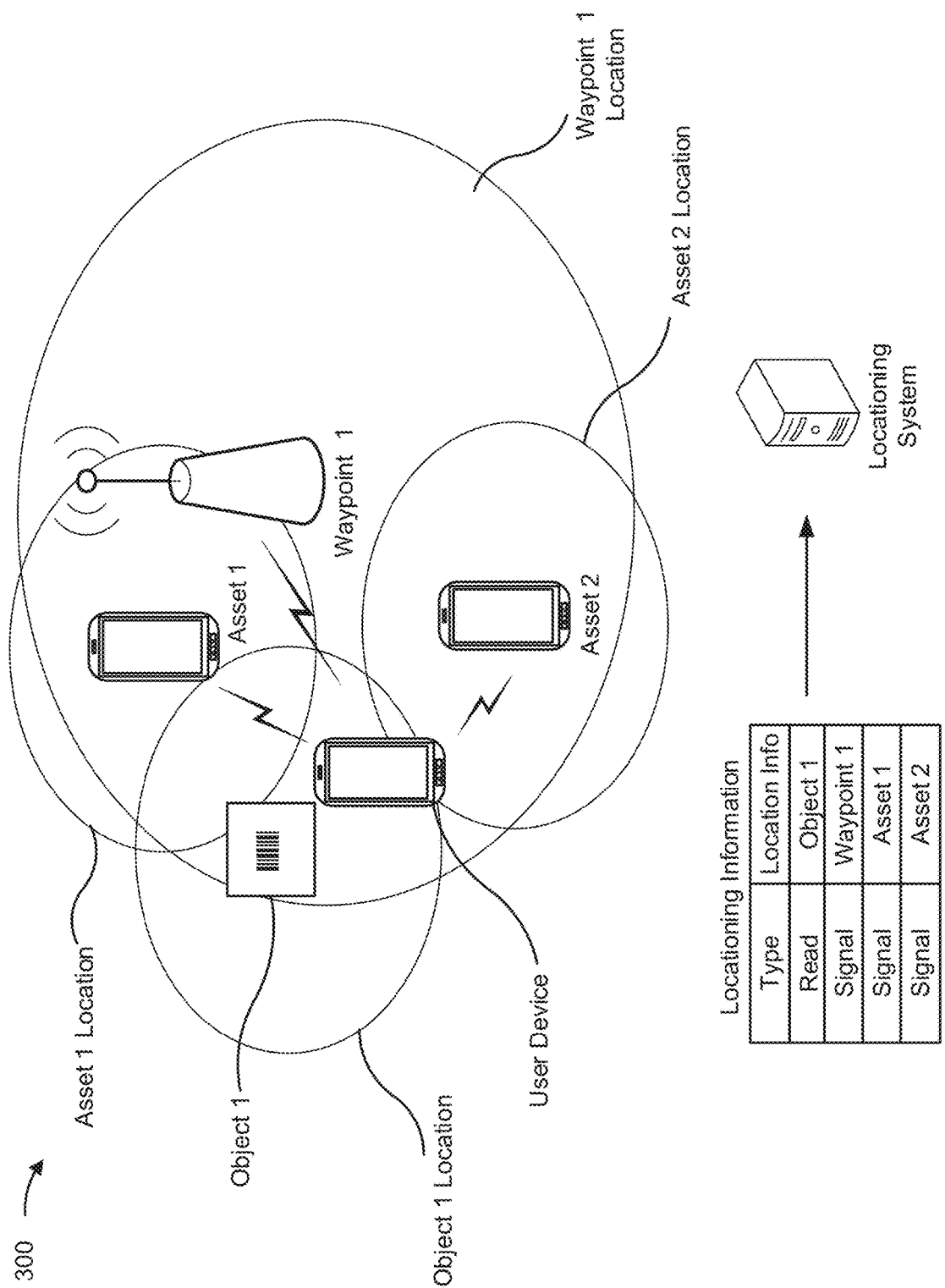
FIG. 3 is a diagram of another example implementation described herein.

FIG. 3 is a diagram of an example implementation 300 associated with a locationing system described herein. As shown in FIG. 3, example implementation 300 includes a user device, an object (Object 1), a first wireless communication device (Waypoint 1), a second wireless communication device (Asset 1), a third wireless communication device (Asset 2), and a locationing system.

As shown in example implementation 300, locationing information may be generated that identifies a type associated with a portion of the locationing information. For example, as shown in FIG. 3, locationing information with a "read" type may be object-based locationing information, as described herein, and locationing information provided with a "signal" type may be signal-based locationing information. The read-type locationing information may be received based on the user device performing a read operation associated with the object. The signal-type locationing information may be received based on the user device receiving a first signal from the first wireless communication device, a second signal from the second wireless communication device, and a third signal from the third wireless communication device.

The locationing system may be configured to determine, track, and/or monitor the respective locations of the user device, the second wireless communication device, and the third wireless communication device as described herein. Accordingly, based on signal characteristics of the signal-based locationing information, an object-based location associated with the object, a known location of the first wireless communication device, and determined locations (e.g., most recently determined locations) of the second wireless communication device and the third wireless communication device, the locationing system may determine a location of the user device (e.g., using a locationing model described herein).

In this way, the locationing system may process the locationing information to determine a location of the user device, as described herein, using known locations of the object, the first wireless communication device, the second wireless communication device, and the third wireless communication device.

As indicated above, FIG. 3 is provided as an example. Other examples may differ from what is described with regard to FIG. 3.

Figure 4:
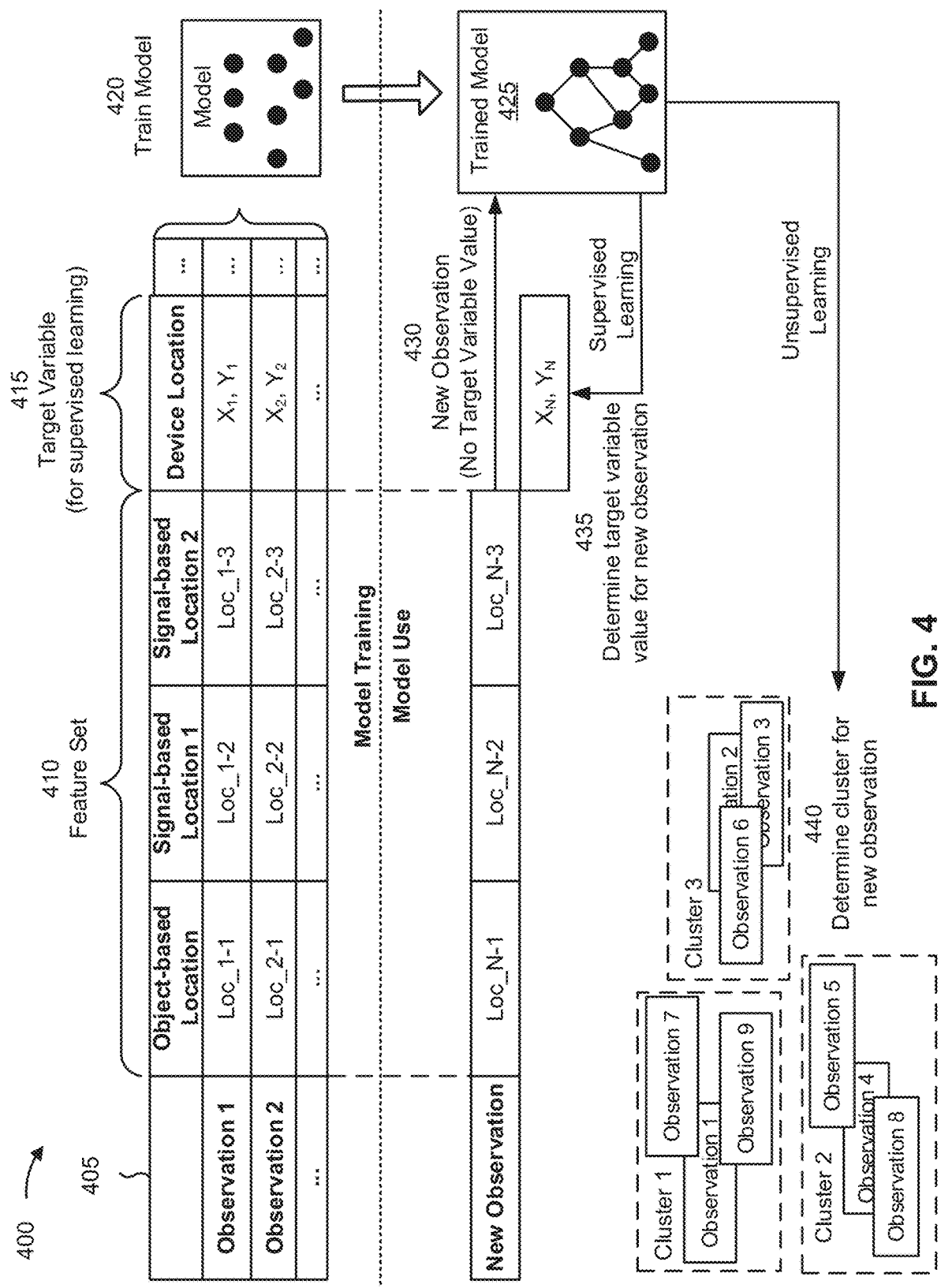
FIG. 4 is a diagram illustrating an example of training and using a machine learning model in connection with determining a location of a user device using read data as described herein.

FIG. 4 is a diagram illustrating an example 400 of training and using a machine learning model in connection with determining a location of a user device using read data as described herein. The machine learning model training and usage described herein may be performed using a machine learning system. The machine learning system may include or may be included in a computing device, a server, a cloud computing environment, or the like, such as the locationing system described in more detail elsewhere herein.

As shown by reference number 405, a machine learning model may be trained using a set of observations. The set of observations may be obtained from training data (e.g., historical data), such as data gathered during one or more processes described herein. In some implementations, the machine learning system may receive the set of observations (e.g., as input) from the user device and/or an inventory data structure, as described elsewhere herein.

As shown by reference number 410, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the user device and/or the inventory data structure. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of an object-based location (Object-based Location), a second feature of a first signal-based location (Signal-based Location 1), a third feature of a second signal-based location (Signal-based Location 2), and so on. As shown, for a first observation, the first feature may have a value of Loc_1-1 (e.g., a value indicative of a location of an object associated with read data), the second feature may have a value of Loc_1-2 (e.g., a value indicative of a potential location of the user device that is determined based on signal information associated with a first wireless communication device), the third feature may have a value of Loc_1-3 (e.g., a value indicative of a potential location of the user device that is determined based on signal information associated with a second wireless communication device), and so on. These features and feature values are provided as examples, and may differ in other examples. For example, the feature set may include one or more of the following features: a type of an object (e.g., a type that is associated with an item from an inventory and/or a type that is associated with a storage location, such as a bin or shelf of configured to store items from an inventory), whether the read data is associated with a barcode or an RFID tag, whether the read data is associated with image data from a camera of the reader, and so on.

As shown by reference number 415, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 400, the target variable is a device location, which has a value of a first coordinate of a locationing grid or other coordinate system of the locationing system (shown as $X_1, Y_1$) for the first observation and a second coordinate (shown as $X_2, Y_2$) for the second observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 420, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 425 to be used to analyze new observations.

As shown by reference number 430, the machine learning system may apply the trained machine learning model 425 to a new observation, such as by receiving a new observation and inputting the new observation to the trained machine learning model 425. As shown, the new observation may include a first feature of an object-based location, a first signal-based location, a second signal-based location, and so on, as an example. The machine learning system may apply the trained machine learning model 425 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 425 may predict a value of coordinates for an estimated location of the user device (shown as $X_N, Y_N$) for the target variable of the device location for the new observation, as shown by reference number 435. Based on this prediction, the machine learning system may provide a recommendation, may provide an output for determination of a first recommendation, may perform an automated action, and/or may cause an automated action to be performed (e.g., by instructing another device to perform the automated action), among other examples. The recommendation may include, for example, a recommendation to retrain the machine learning model and/or a recommendation to provide additional locationing information associated with the user device (e.g., additional object-based locationing information associated with an object in a vicinity of the user device). The automated action may include, for example, indicating a location of the user device, providing the location of the user device, storing the location of the user device to track the user device, and so on.

In some implementations, the trained machine learning model 425 may classify (e.g., cluster) the new observation in a cluster, as shown by reference number 440. The observations within a cluster may have a threshold degree of similarity. The clusters may be designated as being associated with individual locations and/or areas of a particular physical environment. In some implementations, if the machine learning system classifies the new observation in a first cluster (e.g., a cluster that indicated a location of the user device within a first location (or area) of the physical environment), then the machine learning system may provide a first recommendation, such as one or more of the recommendations described above, that is different from a second recommendation that would be provided if the new observation were classified in a second cluster. Additionally, or alternatively, the machine learning system may perform a first automated action and/or may cause a first automated action to be performed (e.g., by instructing another device to perform the automated action) based on classifying the new observation in the first cluster, such as one or more of the automated actions described above, which may be different from a second automated action that is different from the first automated action.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to determining a location of a user device based on read data sent from the user device. The machine learning system enables recognition and/or identification of tens, hundreds, thousands, or millions of features and/or feature values for tens, hundreds, thousands, or millions of observations, thereby increasing accuracy and consistency and reducing delay associated with determining a location of the user device relative to requiring computing resources to be allocated for tens, hundreds, or thousands of operators to manually determine a location of the user device using the features or feature values.

As indicated above, FIG. 4 is provided as an example. Other examples may differ from what is described in connection with FIG. 4.

Figure 5:
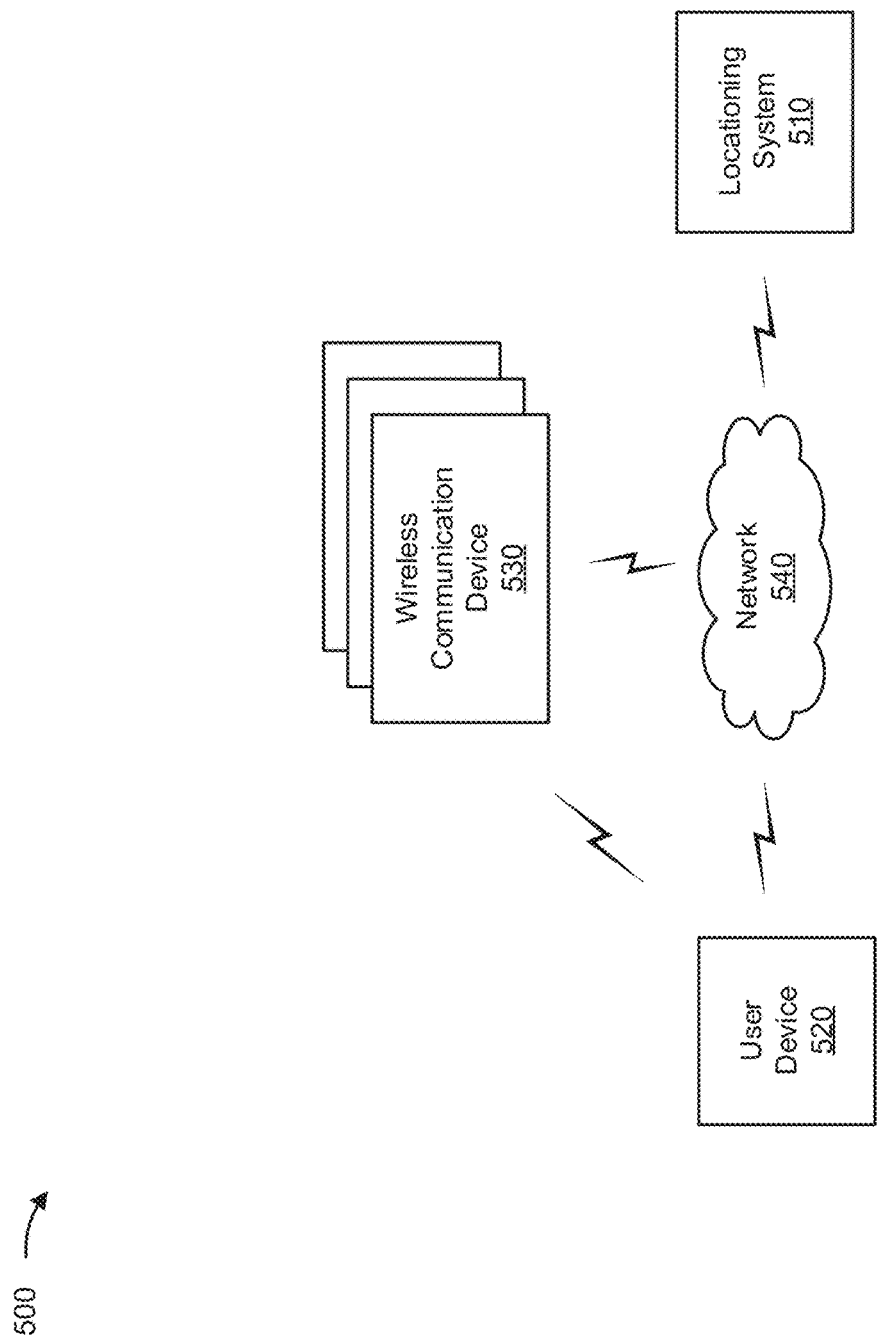
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a locationing system 510, a user device 520, one or more wireless communication devices 530, and a network 540. Devices of environment 500 may interconnect via wired connections, wireless connections, or a combination of wired and wireless connections.

The locationing system 510 includes one or more devices capable of receiving, generating, storing, processing, providing, and/or routing information associated with determining a location of the user device 520 based on read data from a reader of the user device 520, as described elsewhere herein. The locationing system 510 may include a communication device and/or a computing device. For example, the locationing system 510 may include a server, such as an application server, a client server, a web server, a database server, a host server, a proxy server, a virtual server (e.g., executing on computing hardware), or a server in a cloud computing system. In some implementations, the locationing system 510 includes computing hardware used in a cloud computing environment.

The user device 520 includes one or more devices capable of receiving, generating, storing, processing, and/or providing information associated with an object and/or a location of the user device, as described elsewhere herein. The user device 520 may include a communication device and/or a computing device. For example, the user device 520 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The wireless communication device 530 includes one or more devices capable of receiving, generating, storing, processing, and/or providing locationing signals in order to determine the location of the user device 520, as described elsewhere herein. The wireless communication device 530 may include a communication device and/or a computing device. For example, the wireless communication device 530 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 540 includes one or more wired and/or wireless networks. For example, the network 540 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 540 enables communication among the devices of environment 500.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
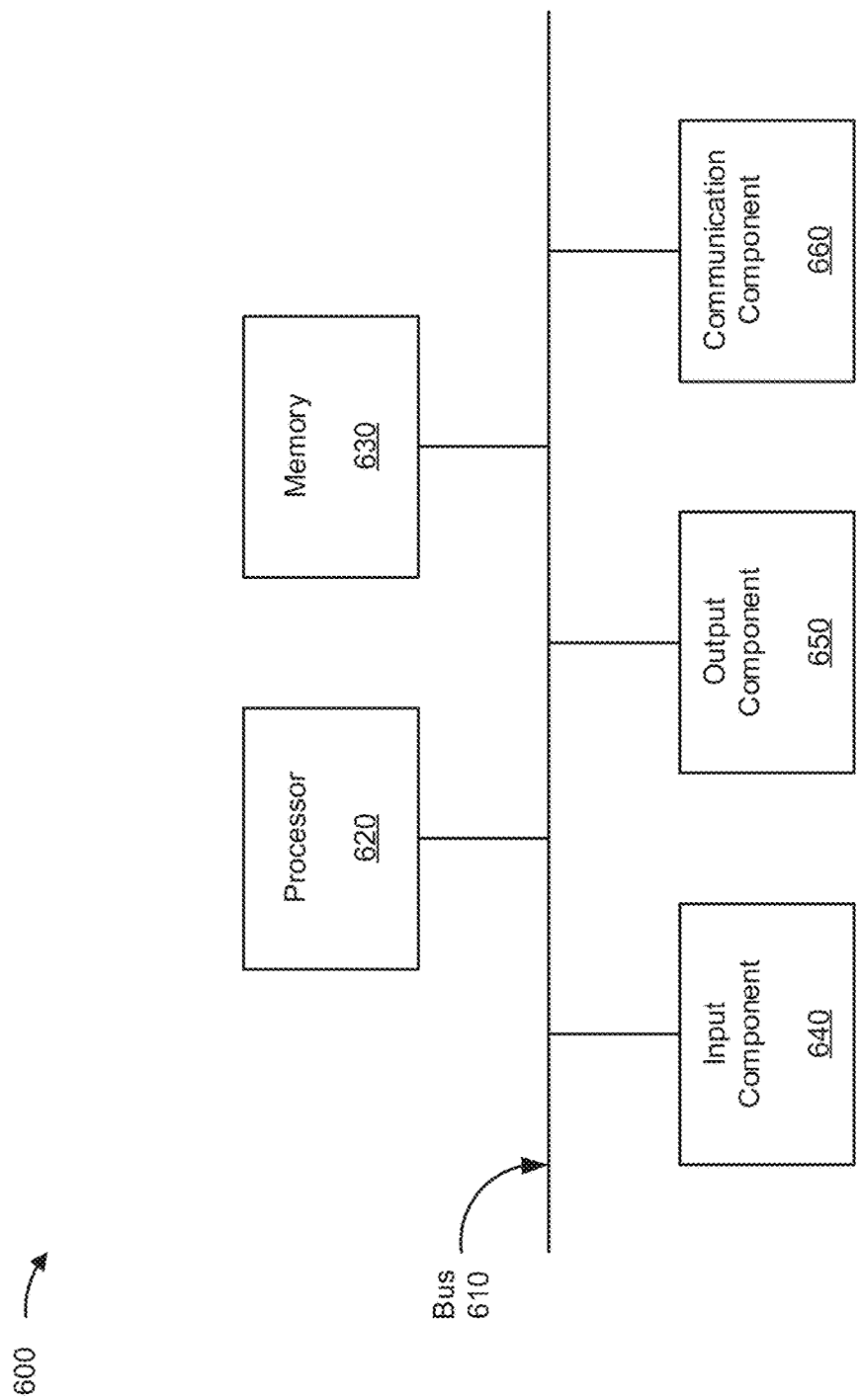
FIG. 6 is a diagram of example components of one or more devices of FIG. 4.

FIG. 6 is a diagram of example components of a device 600, which may correspond to the locationing system 510, the user device 520, and/or the wireless communication device 530. In some implementations, the locationing system 510, the user device 520, and/or the wireless communication device 530 may include one or more devices 600 and/or one or more components of device 600. As shown in FIG. 6, device 600 may include a bus 610, a processor 620, a memory 630, an input component 640, an output component 650, and a communication component 660.

Bus 610 includes one or more components that enable wired and/or wireless communication among the components of device 600. Bus 610 may couple together two or more components of FIG. 6, such as via operative coupling, communicative coupling, electronic coupling, and/or electric coupling. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform one or more operations or processes described elsewhere herein.

Memory 630 includes volatile and/or nonvolatile memory. For example, memory 630 may include random access memory (RAM), read only memory (ROM), a hard disk drive, and/or another type of memory (e.g., a flash memory, a magnetic memory, and/or an optical memory). Memory 630 may include internal memory (e.g., RAM, ROM, or a hard disk drive) and/or removable memory (e.g., removable via a universal serial bus connection). Memory 630 may be a non-transitory computer-readable medium. Memory 630 stores information, instructions, and/or software (e.g., one or more software applications) related to the operation of device 600. In some implementations, memory 630 includes one or more memories that are coupled to one or more processors (e.g., processor 620), such as via bus 610.

Input component 640 enables device 600 to receive input, such as user input and/or sensed input. For example, input component 640 may include a touch screen, a keyboard, a keypad, a mouse, a button, a microphone, a switch, a sensor, a global positioning system sensor, an accelerometer, a gyroscope, and/or an actuator. Output component 650 enables device 600 to provide output, such as via a display, a speaker, and/or a light-emitting diode. Communication component 660 enables device 600 to communicate with other devices via a wired connection and/or a wireless connection. For example, communication component 660 may include a receiver, a transmitter, a transceiver, a modem, a network interface card, and/or an antenna.

Device 600 may perform one or more operations or processes described herein. For example, a non-transitory computer-readable medium (e.g., memory 630) may store a set of instructions (e.g., one or more instructions or code) for execution by processor 620. Processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry is used instead of or in combination with the instructions to perform one or more operations or processes described herein. Additionally, or alternatively, processor 620 may be configured to perform one or more operations or processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
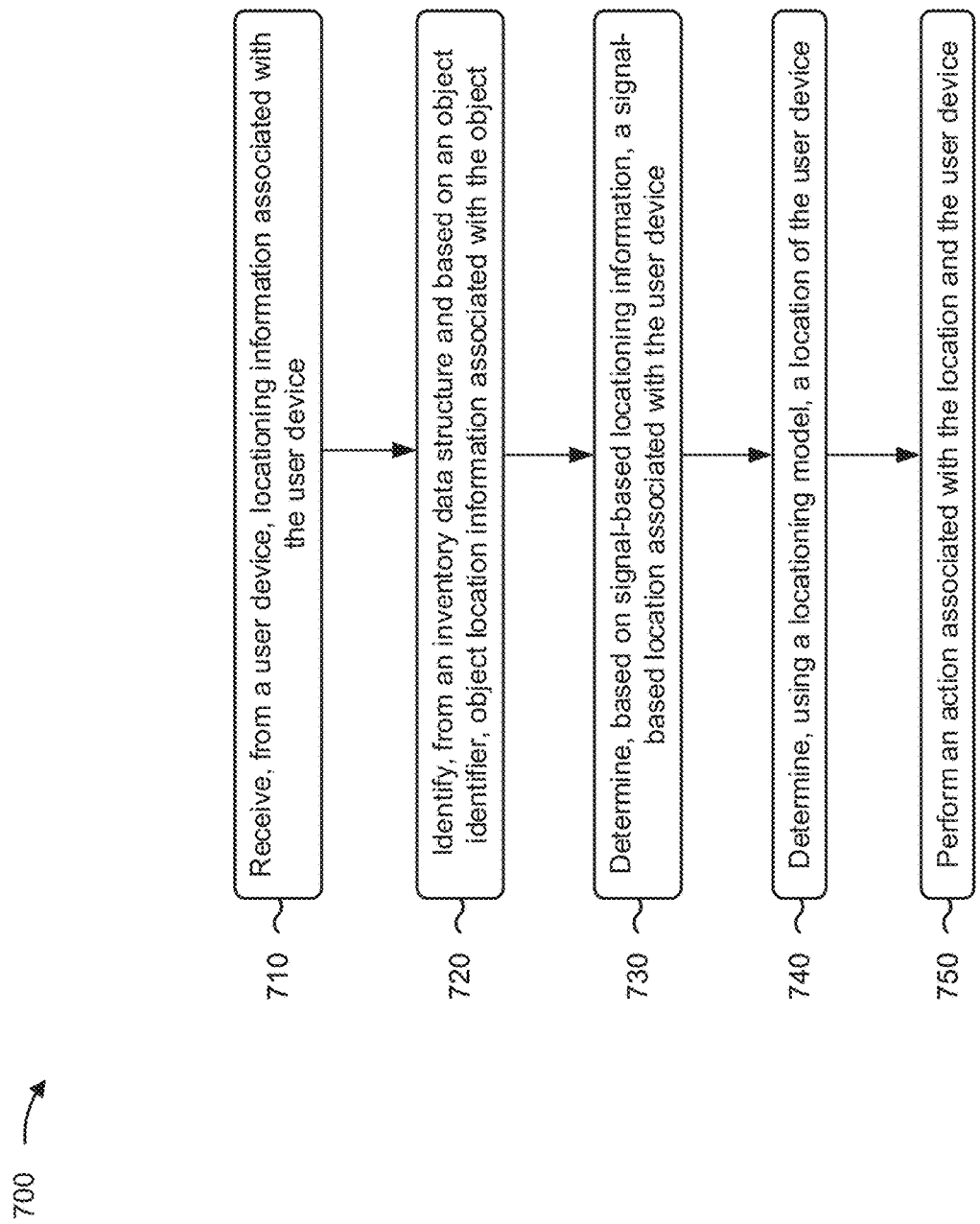
FIG. 7 is a flowchart of an example process associated with a locationing system that utilizes read data of a reader of a device.

FIG. 7 is a flowchart of an example process 700 associated with a locationing system that utilizes read data of a reader of a device. In some implementations, one or more process blocks of FIG. 7 may be performed by a locationing system (e.g., the locationing system 510). In some implementations, one or more process blocks of FIG. 7 may be performed by another device or a group of devices separate from or including the locationing system, such as a user device (e.g., the user device 520) and/or a wireless communication device (e.g., the wireless communication device 530). Additionally, or alternatively, one or more process blocks of FIG. 7 may be performed by one or more components of device 600, such as processor 620, memory 630, input component 640, output component 650, and/or communication component 660.

As shown in FIG. 7, process 700 may include receiving, from a user device, locationing information associated with the user device (block 710). For example, the locationing system may receive, from a user device, locationing information associated with the user device, as described above. The locationing information may include signal-based locationing information associated with a wireless communication device associated with the locationing system and an object identifier associated with an object identified by read data obtained by a reader of the user device.

The reader may be a barcode reader and the object identifier may be received based on the read data being associated with a decoding of a barcode associated with the object. In some implementations, the reader may be an RFID reader and the object identifier may be received based on the read data being associated with a read of an RFID tag associated with the object. Additionally, or alternatively, the reader may be a camera and the object information may be received based on the read data being associated with an image that depicts the object and an output of an image processing model that is configured to identify the object via the object information.

In some implementations, the signal-based locationing information includes a characteristic of a signal that is received from the wireless communication device, wherein the characteristic includes at least one of a signal-to-noise ratio of the signal, an RSSI (and/or received signal power) associated with the signal, or a frequency of the signal. The wireless communication device may include a locationing beacon of the locationing system. For example, such a locationing beacon may include a waypoint device and/or another user device (e.g., a user device configured as a p2p beacon).

As further shown in FIG. 7, process 700 may include identifying, from an inventory data structure and based on the object identifier, object location information associated with the object (block 720). For example, the locationing system may look up the object identifier in the inventory data structure to identify the object location information associated with the object, as described above.

In some implementations, the inventory data structure associates the object identifier with the object location. The inventory data structure may include a plurality of entries associated with a plurality of objects within a physical environment associated with the locationing system, wherein the plurality of entries individually indicate corresponding locations, within the physical environment, of one or more objects of the plurality of objects.

As further shown in FIG. 7, process 700 may include determining, based on the signal-based locationing information, a signal-based location associated with the user device (block 730). For example, the locationing system may determine, based on the signal-based locationing information, the device location information associated with the user device, as described above.

As further shown in FIG. 7, process 700 may include determining, using a locationing model, a location of the user device (block 740). The locationing model may be configured to indicate the location of the user device based on the object location information and the signal-based location. In some implementations, the locationing system may determine, based on the object location information and the signal-based location, the location of the user device, as described above.

The locationing model that may be configured to identify locations of user devices based on historical data associated with previously locating the user devices within a physical environment associated with the locationing system. In some implementations, the locationing model may include a machine learning model that is trained based on the historical data, and the historical data may include historical signal information associated with wireless communication devices associated with the locationing system and object locations indicated in an inventory data structure.

In some implementations, to identify the location of the user device, the locationing system may apply a first weight to the object-based locationing information and a second weight to the signal-based locationing information that is different from the first weight. The locationing system may identify the location according to the first weight and the second weight. The first weight may be applied based on a first confidence score that is indicative of a likelihood that the object is located at the first location, and the second weight may be applied based on a second confidence score that is indicative of a degree of accuracy associated with determining a second location (e.g., a signal-based location). The likelihood that the object is located at the first location may be determined based on a distance between the second location and a location that is associated with the object in an inventory data structure. The degree of accuracy associated with determining the second location may be determined based on a characteristic of a signal that is identified in the signal information.

As further shown in FIG. 7, process 700 may include performing an action associated with the location and the user device (block 750). For example, the locationing system may perform an action associated with the location and the user device, as described above.

In some implementations, the locationing system may provide, to another user device, location information that identifies the location. The locationing system may indicate, via a user interface, the location in association with an identifier of the user device. Additionally, or alternatively, the locationing system may store the location information in association with the identifier of the user device.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a locationing system and from a user device, locationing information associated with the user device, the locationing information including signal-based locationing information associated with a wireless communication device associated with the locationing system, and an object identifier associated with an object identified by read data obtained by a reader of the user device;
   identifying, by the locationing system and from an inventory data structure, based on the object identifier, object location information associated with the object, the inventory data structure associating the object identifier with the object location;
   determining, by the locationing system and based on the signal-based locationing information, a signal-based location associated with the user device;
   training a machine learning model of a locationing model based on historical data associated with previously locating user devices within a physical environment associated with the locationing system, the historical data including historical signal information associated with wireless communication devices associated with the locationing system and object locations indicated in the inventory data structure;
   determining, by the locationing system and using the locationing model, a location of the user device, the locationing model being configured to indicate the location of the user device based on the object location information and the signal-based location, and identify locations of the user devices based on the historical data; and
   performing, by the locationing system, an action associated with the location and the user device.

2. The method of claim 1, wherein the signal-based locationing information includes a characteristic of a signal that is received from the wireless communication device, wherein the characteristic includes at least one of:
   a signal-to-noise ratio of the signal,
   a received signal strength indicator associated with the signal, or
   a frequency of the signal.

3. The method of claim 1, wherein the reader includes a barcode reader and the object identifier is received based on the read data being associated with a decoding of a barcode associated with the object.

4. The method of claim 1, wherein the wireless communication device comprises a locationing beacon of the locationing system.

5. The method of claim 1, wherein the inventory data structure comprises a plurality of entries associated with a plurality of objects within a physical environment associated with the locationing system,
   wherein the plurality of entries individually indicate corresponding locations, within the physical environment, of one or more objects of the plurality of objects.

6. The method of claim 1, wherein performing the action comprises at least one of:
   providing, to another user device, location information that identifies the location,
   indicating, via a user interface, the location in association with an identifier of the user device, or
   storing the location information in association with the identifier of the user device.

7. A device associated with a locationing system, comprising:
   one or more memories; and
   one or more processors, coupled to the one or more memories, configured to:
      receive, from a user device, an object identifier associated with an object in a physical environment, the object identifier being received based on read data from a reader of the user device;
      determine, based on the object identifier, object-based locationing information associated with a first location associated with the object;
      receive signal information associated with a wireless communication device that is associated with the locationing system;
      determine, based on the signal information, signal-based locationing information associated with the user device, the signal-based locationing information being relative to a second location associated with the wireless communication device;
      process, using a locationing model, the object-based locationing information and the signal-based locationing information to identify a location of the user device that is based on the first location and the second location; and
      perform an action associated with the location and the user device, wherein
   the locationing model comprises a machine learning model that is trained to identify locations of user devices based on historical data associated with previously locating the user devices within the physical environment, and
   the historical data includes historical signal information associated with wireless communication devices associated with the locationing system and object locations indicated in an inventory data structure.

8. The device of claim 7, wherein the signal information includes a characteristic of a signal that is received from the wireless communication device.

9. The device of claim 7, wherein the reader includes a radio frequency identification (RFID) reader and the object identifier is received based on the read data being associated with a read of an RFID tag associated with the object.

10. The device of claim 7, wherein the object-based locationing information is determined from an inventory data structure that associates the object identifier with the object-based locationing information.

11. The device of claim 10, wherein the inventory data structure comprises a plurality of entries associated with a plurality of objects within the physical environment,
wherein the plurality of entries individually indicate corresponding locations, within the physical environment, of one or more objects of the plurality of objects.

\* \* \* \* \*